March 17, 1936.  A. S. KNAPP  2,034,301
GRAPEFRUIT JUICE EXTRACTOR
Filed March 27, 1931  2 Sheets-Sheet 1
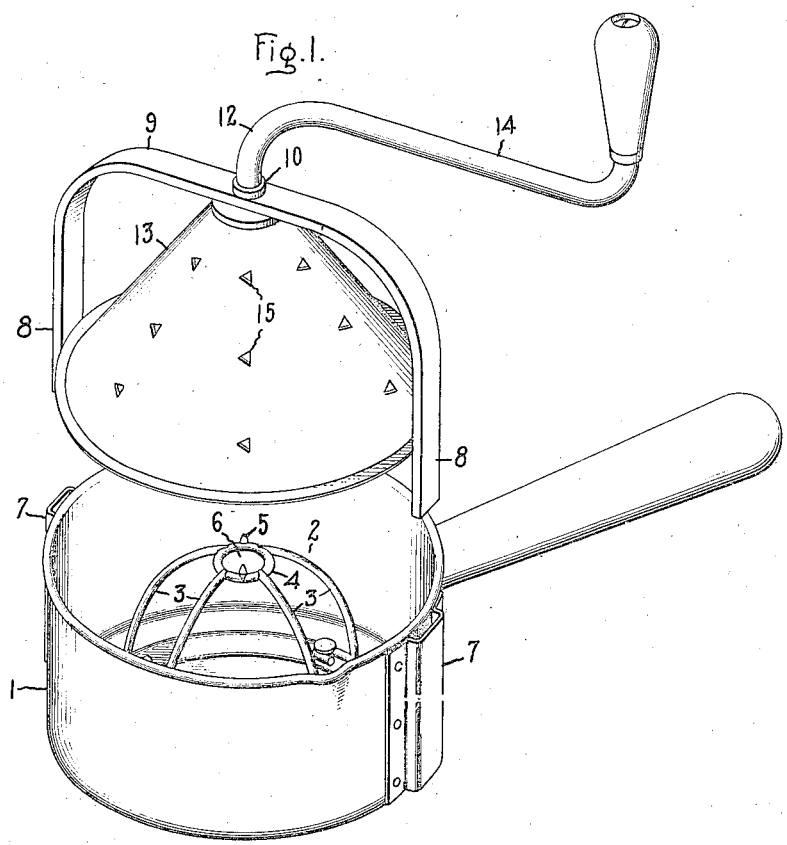
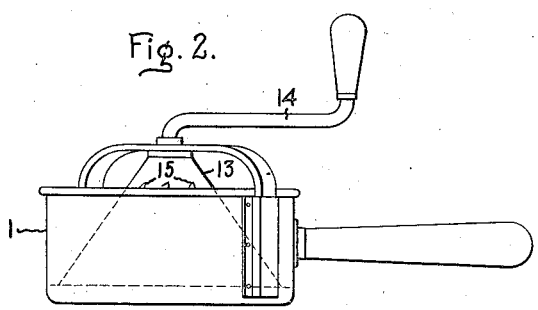
Inventor:
Andrew S. Knapp,
by Edward Williams.
His Attorney.

March 17, 1936.  A. S. KNAPP  2,034,301
GRAPEFRUIT JUICE EXTRACTOR
Filed March 27, 1931  2 Sheets-Sheet 2
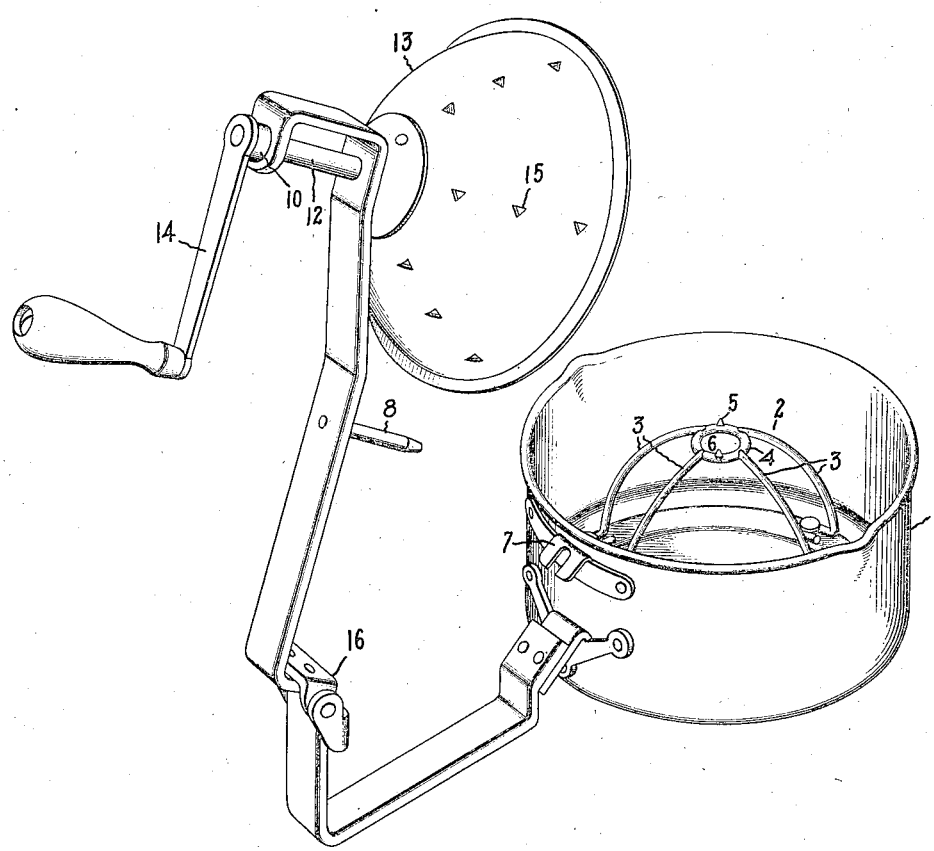
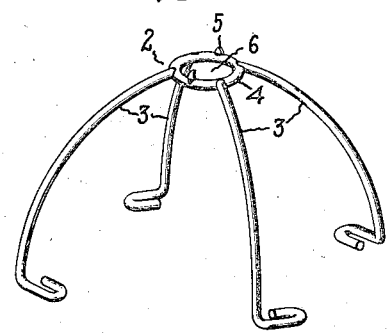
Inventor:
Andrew S. Knapp,
by Edward Williams
His Attorney.

Patented Mar. 17, 1936

2,034,301

UNITED STATES PATENT OFFICE 2,034,301

GRAPEFRUIT JUICE EXTRACTOR

Andrew Stephen Knapp, St. Louis, Mo., assignor to Knapp Monarch Company, Inc., Belleville, Ill., a corporation of Missouri Application March 27, 1931, Serial No. 525,733

4 Claims. (Cl. 146—3)

My invention relates to improvements in fruit juice extractors for extracting the juice from citrus fruits such as grapefruit.

Such fruits are characterized by a hard fibrous core and tough radial membranes extending from such core to the skin of the fruit. Because of such structure it has been found that a simple enlargement of a juice extractor of the type used for removing the juice from such fruits as oranges and lemons is inadequate for the removal of juice from grapefruit, the core and membranes of the grapefruit offering such resistance during the juice extracting operation as to make such operation extremely arduous and difficult. It has also been found that the extraction of juice from grapefruit, by means of an enlarged juice extractor designed for use with oranges or lemons, is not satisfactory, not only because of the difficulty but also because such removal of juice necessarily results in the crushing and tearing of the core and the radial membranes, and the consequent liberation of the objectionable bitter substances contained in these portions of the fruit.

Previous attempts to lessen the difficulty of the extracting operation have resulted in fruit juice extractors having extracting members in the form of curved radial knives terminating near the peak of the extracting member in sharp cutting edges. The extraction of fruit juice by means of this type of extractor results in the cutting and macerating of the radial membranes and skin of the fruit and while lessening the force necessary to the extracting operation does not eliminate the releasing of the above mentioned objectionable bitter substance from the radial membranes and skin of the fruit.

Fruit juice extractors have also been provided with propelling members mounted on arms hinged to the extracting member or juice receiving cup and adapted to rotate the fruit while forcing it down over the extracting member. There is, of course, during the extracting operation a considerable amount of sidethrust and twist on the propelling member due to the resistance offered to the rotation of the fruit by the extracting member. This sidethrust and twist has resulted, in previous juice extractors, in scraping and rubbing the propelling means on the juice receiving cup and extracting member and also in materially weakening the hinged mounting of the propelling means and consequently shortening the useful life of the fruit juice extractor.

An object of my invention is to provide a device for removing the juice from a grapefruit while leaving the core, the radial membranes and the skin thereof substantially intact.

Another object of my invention is to provide means for severing the radial membranes of the fruit from the core during the juice extracting operation and so reduce to a minimum both the resistance offered to the extracting operation and the amount of objectionable substance which would be released by the tearing of the core, radial membranes, or skin.

A further object of my invention is to provide compact rugged means for guiding the propelling member of a fruit juice extractor during the extracting operation and for overcoming the twist and sidethrust exerted on the propelling means incident to the juice extracting operation.

Another object of my invention is the provision of a convenient and easily operable household fruit juice extractor which any member of the household may use to obtain from grapefruit a superior quality of grapefruit juice.

Other objects and advantages will become apparent as the description proceeds.

Accordingly, I provide, in a new and useful form of juice extractor, an extracting member whose fruit engaging surfaces do not extend to its geometrical center, but terminate at a short distance therefrom in a collar-like member on which are mounted one or more relatively small cutting tangs. By this unique construction of the juice extracting member the resistance which the hard core and radial membranes of the fruit would offer during the juice extracting operation is overcome. It will be noticed that as the fruit is rotated and worked over the extracting member a pressure is applied only on the juice containing cells between the core and the skin of the fruit. The juice cells are thus ruptured and the effort required to do this is minimized because the resistance which the hard core and the tough radial fibers would offer to the pressure applied, is eliminated, that is, as the fruit is rotated and worked down over the extracting member the small cutting tangs are successively brought into contact with the radial membranes of the fruit to sever such membranes from the core in proximity to its periphery and so allow the core to pass cleanly through the opening around which the cutters are mounted. I prefer to form my extracting member of rigid wires. Wires are particularly advantageous because a blunt edge is presented to the juice carrying cells.

A further advantage of my juice extractor resides in the novel means provided for guiding the movement of the propelling member over the extracting member during the juice extracting operation, and for overcoming the twisting force and the sidethrust exerted on the propelling member incident to such operation.

In the preferred form of my invention I provide a yoke for supporting the propelling means and guides adapted to telescope with the yoke and slideably support it over the extracting member. By so doing I am enabled to obtain a progressive motion of the fruit over the extracting member which is at all times in a vertical direction, which motion further minimizes both the effort required during the juice extracting operation, and the amount of objectionable bitter substance released from the core and fibres of the fruit. It will be noted that with the type of mounting for the propelling means here employed the tendency of the juice receiving cup or extracting member to turn with the fruit and the tendency of the propelling means to move out of alignment with the extracting member is overcome.

Referring now to the drawings in which the same reference figures represent the same parts throughout; Figure 1 is a perspective view of the preferred form of my improved grapefruit juice extractor in open position preparatory to the placing of the fruit in the juice extractor; Fig. 2 is a side view of the fruit juice extractor in closed position at the completion of the juice extracting operation; Fig. 3 illustrates one form which the juice extracting member may take, and Fig. 4 shows my guiding means and improved extracting member as applied to another type of fruit juice extractor.

In accordance with the present invention, as shown in Fig. 1, I place within a juice receiving cup 1, a juice extracting member 2, which is constructed of the arcuate wire members 3 supporting at their upper ends a collar-like member 4, on which are mounted the small cutting tangs 5. The collar-like member 4 is centered on the geometrical axis of the extracting member and encloses the core-accommodating opening 6. In the embodiment here shown the collar-like member 4 is stamped out in the flat and the cutting tangs 5 upstruck from it. Lengths of wire are then so formed as to compose two of the arcuate members 3 connected at their upper ends and substantially at right angles to each other. The complete extracting member is then formed by bending the stamped piece over the connecting portion of two of such pairs of arcuate wire members. It should be understood, however, that I do not limit myself to this construction, as it obviously is possible to build many forms of similar extractors with welded or soldered joints. To the side of the cup 1 are secured two guiding members 7 for slideably engaging the depending arms 8 of a yoke 9. A bearing 10 is supported directly above the geometrical axis of the extracting member 2, by the crosspiece 11. Through this bearing is supported the propelling means, consisting of a shaft 12, an impaling member 13 carried on one end of such shaft, and a crank 14 carried on the other end of said shaft. The shaft 12 may be either rigidly or slideably carried by the bearing 10 with respect to movement in a vertical direction. I prefer, however, to provide a slideable mounting of the shaft 12 in bearing 10 as this enables me to provide a more compact device, that is, by slideably mounting the shaft 12 I am enabled to shorten the arms 8 and still allow sufficient separation of the impaling member 13 and the extracting member 2 to permit placing one-half of a grapefruit between them without disengaging arms 8 from contact with guides 9.

In operation the grapefruit is first cut into two parts, the telescoping members 7 and 8 extended to their most extended position, the shaft 12 moved to its upper position, and one-half of the fruit placed over the extracting member 2. It will be noticed that the core of the fruit will naturally rest within the opening 6. The yoke 9 and the impaling member 13 are then lowered until the tangs 15 engage the skin of the fruit. The handle 14 is then rotated and the fruit (through the cooperating impaling member 13 and the tangs 15) is rotated over the extractor 2. By applying a slight pressure between the impaling member and the extracting member while rotating the handle, a force is exerted on the juice carrying cells between the core and the skin of the fruit, rupturing the cells and releasing the juices which flow to the bottom of the cup 1. As the extracting operation continues the pressure is maintained, the slideable members 8 telescope within the guides 7 and more and more of the juice carrying cells are ruptured, while at the same time the small cutters 5 are progressively severing the radial tissues of the fruit from the core so as to allow the core to pass cleaning downward through the opening 6. It is to be noted that as the impaling member gradually urges the fruit downwardly, the fruit moves at all times along the geometrical axis of the extracting member. Thus all slicing and cutting of the core is eliminated, all tendency of the radial tissues to oppose the force applied to the juice carrying cells is removed, and a clean, easy, and complete extraction of the juice is obtained.

Referring now to Fig. 3, as applied to this type of fruit juice extractor the guiding means takes the form of a pin 8 mounted on the crosspiece 11 in which the bearings 10 support the shaft 12 to which are fastened the impaling member 13 and the crank 14. The pin 8 moves downwardly through the guide 7, during the juice extracting operation and serves to overcome the twisting force and sidethrust incident to such operation, and so relieve the hinge 16 of the strain which in previous types of extractors has resulted in eventually weakening the hinge and destroying the serviceability of the fruit juice extractor.

The juice extractor 2 may be secured within the cup 1 by any suitable means. It may be removably secured by the provision of headed rivets and the like. It may be riveted to the bottom of the cup, or it may be welded or soldered.

While the embodiments of the invention illustrated in the drawings have been described with considerable particularity it is to be expressly understood that the invention is not limited thereto, as the invention may be carried out in a variety of ways, some of which will now readily suggest themselves to those skilled in the art, while changes may be made in detail, dimensions, and arrangements, and certain features used without other features, without departing from the spirit of this invention. Reference is therefore to be had to the claims hereto appended for definition of my invention.

I claim:

1. A fruit juice extractor device comprising a plurality of downwardly diverging wire loops, a collar-like member mounted thereon and connecting their upper ends, and one or more relatively small cutting tangs mounted on said collar-like member and projecting upwardly therefrom.

2. A fruit juice extracting member comprising a non-cutting core encircling member, radiating wires supporting the same, and means for severing the radial membranes of the fruit from the core, said means comprising one or more relatively small cutters extending upwardly from the upper surface of said core encircling member.

3. In a fruit juice extractor, a juice receiving cup, a reamer member mounted therein, guide means on said cup, an arm having one end secured to said cup and projecting away from the cup, a second arm having one end hinged to the outer end of said first arm and extending substantially parallel to said first arm, a fruit impaling member rotatively supported by the inner end of said second arm, and a complementary guide element on said second arm intermediate the ends thereof cooperable with said first guide member to guide said impaling member and resist the side thrust thereof incident to the rotation of the impaling member during the juice extracting operation.

4. In a fruit juice extractor, a juice receiving cup, a reamer member mounted therein, an arm extending laterally from said cup and connected therewith, a second arm extending parallel to the first arm, the outer ends of said arms being hingedly connected together, the inner end of said second arm overhanging said cup, an impaling member rotatively carried by said inner end and cooperating guide means between said arms adjacent the periphery of said cup for confining said second arm against lateral movement relative to said first arm during the juice extraction operation.

ANDREW S. KNAPP.